(12) United States Patent
Monsees

(10) Patent No.: US 6,327,708 B1
(45) Date of Patent: Dec. 4, 2001

(54) SYSTEM OF ABSOLUTE MEASUREMENT FOR RADIOLOGICAL IMAGE LUMINANCE CONTROL

(75) Inventor: Thomas L. Monsees, Oakland, MO (US)

(73) Assignee: True Image, L.L.C., St. Louis, MO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,629

(22) Filed: Sep. 15, 1998

(51) Int. Cl.[7] .............................. H04N 9/00; H04N 7/16; H04N 5/57; H04N 5/58; G09G 1/06
(52) U.S. Cl. ........................ 725/12; 348/189; 348/602; 345/207; 345/10
(58) Field of Search .................................... 348/180, 182, 348/189, 190, 602; 725/12, 9; 345/207, 10; H04N 9/00, 7/16, 17/00, 17/02; G09G 1/06, 5/00

(56) References Cited

U.S. PATENT DOCUMENTS

| | | |
|---|---|---|
| 2,264,172 | 11/1941 | Batchelor . |
| 3,104,281 | 9/1963 | Wolff . |
| 3,112,424 | 11/1963 | Suhrmann . |
| 3,147,341 | 9/1964 | Gibson, Jr. . |
| 3,153,172 | 10/1964 | Ku Sun Ling . |
| 3,164,673 | 1/1965 | Sharon . |
| 3,165,582 | 1/1965 | Korda . |
| 3,214,517 | 10/1965 | Vogt et al. . |
| 3,376,465 | 4/1968 | Corpew . |
| 3,471,470 | 10/1969 | Dreyfoos, Jr. et al. . |
| 3,649,755 | 3/1972 | Newman . |
| 3,715,617 | * 2/1973 | Tilton et al. ............................ 325/10 |
| 4,386,345 | * 5/1983 | Narveson et al. .................... 348/602 |
| 4,451,849 | 5/1984 | Fuhrer . |
| 4,514,727 | 4/1985 | Van Antwerp . |
| 4,589,022 | 5/1986 | Prince et al. . |
| 4,769,708 | 9/1988 | Stroughton . |
| 4,799,107 | 1/1989 | Stoughton et al. . |
| 4,952,917 | 8/1990 | Yabouuchi . |
| 5,057,744 | 10/1991 | Barbier et al. . |
| 5,270,818 | 12/1993 | Ottenstein . |
| 5,444,755 | 8/1995 | Haendle et al. . |
| 5,585,841 | 12/1996 | Hardin . |
| 5,754,682 | * 5/1998 | Katoh ................................... 348/602 |

OTHER PUBLICATIONS

Sony Beam–Index CRT, publisher and date unknown.

* cited by examiner

Primary Examiner—Andrew Faile
Assistant Examiner—Vivek Srivastava
(74) Attorney, Agent, or Firm—Peter S. Gilster; Greensfelder, Hemker & Gale, P.C.

(57) ABSTRACT

An inconspicuous system is defined for measuring the absolute luminance of a CRT display and the actual effective luminance as would be measured from the viewer's perspective due to additional reflected ambient illuminance in order to enable closed loop adjustment of the display device and to thereby enable luminance quality control, facilitate image perception, and ascertain fidelity of image presentation conveniently over time.

13 Claims, 2 Drawing Sheets

SYSTEM OF ABSOLUTE MEASUREMENT FOR RADIOLOGICAL IMAGE LUMINANCE CONTROL

CROSS-REFERENCE TO RELATED APPLICATION

This application is a continuation-in-part of application Ser. No. 08/647,426, filed Mar. 11, 1996 entitled SYSTEM OF ABSOLUTE MEASUREMENT FOR RADIOLOGICAL IMAGE LUMINANCE CONTROL, now abandoned.

BACKGROUND OF THE INVENTION

This invention relates to cathode ray tube ("CRT") display of radiographic and other images of critical contrast detail by computer-controlled technique, and more particularly, to an improved system for measuring the absolute luminance of the CRT display and the actual effective luminance as would be measured from the viewer's perspective due to additional reflected ambient illuminance in order to enable closed loop adjustment of the display device and to thereby facilitate image perception and ascertain fidelity of image presentation conveniently over time. Such absolute measurements of device luminance performance and viewing environment can be reported to the presenting computer for optimization of task dependent image processing and quality control.

In the display of radiologic images by CRTs of a computer network as in a medical institution, whether by one display terminal or by any of multiple display terminals of a computer network, digital representations of images from various digital modalities are stored in computer memory and on computer media. The image representations are retrieved and displayed in any of various locations where there is such a display terminal for presentation, consultation, analysis, interpretation, and/or diagnosis. The digital representation of an image is converted to a matrix of quantified (pixel) values which ultimately determine the luminance of a uniquely associated area of the CRT face. The image is maintained for multiple seconds. The fidelity of image representation is inherently well-controlled by nature of its digital embodiment and conventional digital system practices. However, upon transformation to a luminous embodiment and presentation to the human visual system, the perceived image may differ from the "true" image as control for this final step has historically remained far less stringent. The ultimate consequences that result from suboptimal control range in significance from lowered productivity to missed pathology.

Two general display effects which perturb or delay the fidelity of transfer from pixel image to successful perception of subtle contrast detail are:

1) The CRT display device may be installed and certified to operate at an established luminance specification. Over time (which may vary from weeks to years depending on usage and design compromises) the effective luminance performance will degrade in response to factors such as "aging" of the cathode, phosphor, and glass (browning). It is desirable to be able to compensate for these inevitable CRT effects automatically.

2) The ambient light levels where the CRT display device is being used may be variable. It is not practical to always set room ambient lighting levels to accommodate the CRT display intensity for optimal image perception. The opposite may be desired: One wishes to establish display intensity, within the capability of the display device, as will maximize image fidelity by compensating for ambient lighting levels determined by a more critical task. As a simplified example, in a darkened room where ambient light level is low, minimum display luminance need be selected so that image areas of differing low brightness may be discerned without creating the perception of false contours while areas of higher brightness do not coalesce unnecessarily. In a more brightly illuminated surround, image areas of differing low luminance may fail to be discerned because of degraded contrast, even when image areas of higher brightness are entirely and accurately readable. It is desirable to present the image for maximum perceived contrast commensurate with the luminance specification of the CRT device and the level of ambient illuminance.

One scientifically based method for representing the absolute luminous performance of a CRT display device is the 'characteristic curve' exemplified by the dashed line graph in FIG. 1. Here, the X axis represents the constant video drive level presented to the device over a display area and the Y axis represents the luminance value measured at the corresponding display area. Typically, the video drive level is a voltage between 0 volts (black) and 0.7 volts (white) or whatever video range is provided by the computer image source; here the video signal level is represented by an 8 bit digital value from 0 to 255. The absolute luminance is measured with a calibrated photometer (here in candelas per square meter) and plotted logarithmically to facilitate the comparison with the photopic brightness (perceptual) response of the human visual system to luminance (approximately logarithmic). Note that at drive levels where the graph takes on a more horizontal slope the luminance differences for equal changes in drive become correspondingly difficult to perceive. The first effect (display device does not meet luminance specification) can be readily determined from the endpoints of the graph, the maximum and minimum luminance of the display device. The solid line graph represents the characteristic curve of the same display device with ambient light included at the face of the CRT such that the resulting component which is reflected from the face (glass and phosphor) of the CRT over the area being measured by the photometer is not negligible. A measure of the second effect (luminance distortion from ambient light) is readily distinguished by comparing the graphs.

Accordingly, the goal is automatically to determine the luminous response of the monitor and then adjust CRT levels to ensure perception of all displayed pixel level differences (particularly in the "dark" areas) which might otherwise be obscured by ambient light to an accommodated viewer while maintaining an adequate overall contrast ratio of the display device. In the absence of such fidelity of image presentation, the medical professional looking at the image may be presented with a risk of missing critical details of the image. For example, the slight but clinically significant shading within a radiological image might not even be perceived.

Heretofore, users of CRTs who must routinely interpret images with critical contrast detail have resorted to six established methods to achieve luminance quality control, each of which addresses one of the two previously listed effects to thereby assure image fidelity. Each contributing method, the effect addressed, and its principal limitation(s) are outlined:

1) Manual calibration of the CRT, usually involving an external luminance photometer and readjustment of CRT gain and bias controls. This process can effectively control the first listed effect but requires maintenance personnel and external equipment to obtain a series of absolute measurements. Schedules for such maintenance on a preventive basis are not always considered or followed. Nonetheless, this is the "gold" standard for determining absolute luminance calibration of a CRT display device.

2) Manual adjustment of CRT brightness and contrast controls for "zeroing in" image adjustment with unconscious consideration for ambient lighting, as based upon the viewer's subjective determination of what appears to be needed. Such a manual method is often effective against the second listed effect but time-consuming; for any particular image, the viewer must perturb the controls to be sure that the settings are in fact optimal.

3) Measure ambient light with a photometric sensor mounted in the vicinity of the CRT and compensate the net brightness of the displayed image. This method attempts to compensate for the second listed effect automatically. In television display by CRT technique, it has been known for many years to use photocell devices for directly sensing room ambient light and for automatically correcting CRT brightness or intensity drive levels in response to sensed changes in ambient light levels. Such television-related technology is evidenced by U.S. Pat. Nos. 2,264,172; 3,153,172; 3,165,582; 3,214,517; 3,471,740; 3,649,755; 4,589,022; 4,769,708; and 4,799,107. Technology for the demanding ambient of a cockpit is addressed with multiple sensors in U.S. Pat. Nos. 5,057,744; and 5,270,818. These prior ambient light-sensing arrangements are not believed to be fully suitable for CRT display of radiologic and other static images displayed by computer-controlled technique for critical interpretation because a direct measurement of ambient light level, as by using a photocell exposed through an aperture to the room ambient, as heretofore known, may not adequately sense the true illumination impinging over the CRT face. Additionally, the sensor's independent collector is subject to accumulation of dust which will effect its response and, without appropriate filtering to match the spectral response of the human eye, the system may over-respond to infrared or other invisible radiation as is prominent in the spectrum of some artificial lighting.

4) Maintaining a fixed ratio of the brightness of a displayed image to the ambient brightness to effect a fixed image contrast ratio by closed loop feedback to the video amplifier gain. This technique is intended to simultaneously compensate for variations in both the ambient illumination and display system luminance performance. Such a constant contrast system is evidenced by Newman in U.S. Pat. No. 3,649,755. Such a system must position the logarithmic sensor to receive the identical proportion of image brightness to ambient brightness as would be seen by the viewer who would observe the contrast ratio as invariant. Such a position is only certain to be at the same nominal place as the observer's eye and thus is obtrusive. Such a system depends on an approximated definition of contrast $C=(Bc+Ba)/Ba$ which will be problematic as the ambient brightness (Ba) goes to 0. The absence of ambient brightness is not an uncommon situation for critical contrast viewing. Gain adjustment of such a system is not only a function of the luminance performance of the device "hardware" and the ambient illuminance but also depends on the image "software" being displayed (a uniformly light gray image will be presented indistinguishably from a uniformly dark gray image). Such an "editorializing" system may not be compatible for the presentation of processed digital images which have already undergone optimization. Additionally in both methods 3 and 4, with the absence of any absolute measure, the viewer is left to visually determine that the combination of ambient compensation and CRT performance have exceeded a threshold such that the true image may be compromised or unattainable.

5) Analysis of the pixel data to calculate a value which predicts the average image luminance and is used to adjust the overall luminance relative to the ambient. Such method is evidenced in U.S. Pat. No. 4,952,917 and addresses effect 2. This method requires calculating means for predicting image luminance in advance of display. Once again, any continuous modification of device performance based on image content at the display device may preclude benefit from previously computed image enhancement.

6) Use of CRTs with very high brightness capability can minimize the deleterious interaction from ambient light. A fixed contrast ratio can be maintained over a wider range of ambient illuminance than with a CRT display device of lower available brightness. Such method can successfully overwhelm the second listed effect for an extended range of illuminance. The method can be expensive to implement. Viewer performance may not be enhanced if luminance is increased without maintaining contrast. Since brightness is roughly a logarithmic function of luminance, substantial CRT luminance increases must be achieved to effect modest contrast improvement.

The existing methods are not adequate to the goals of wide scale deployment (low cost), increased productivity (automatic operation) and absolute measure (quality control) for high fidelity presentation to readers of images with critical contrast detail.

SUMMARY OF THE INVENTION

It is in view of the above problems that the present invention was developed.

Among the several features, objects and advantages of the present invention are the provision of an improved system for 1) unobtrusive absolute measurement of luminance performance of a CRT display device 2) closed loop feedback of absolute measurements to obtain visually matching luminance adjustments of CRT display devices 3) reporting of luminance performance of CRT display device and ambient illuminance from the device back to the host computer through existing standard cabling to enable image processing which is optimized to the performance of the particular display device and luminous environment; which can determine the luminance of the CRT and the ambient illuminance onto the face of the CRT from the same physical sensor; which can measure the contribution to luminance which is the result of ambient light impinging upon the CRT face and reflecting off the display surface and underlying layers; which ensures that a medical professional looking at the same "data" upon any CRT equipped with the system across an enterprise network will perceive precisely the same image and will not risk missing critical details of any image because of loss of image perception resulting from luminance calibration drift or uncompensated ambient light level; which can signify when the combination of ambient illuminance and performance of the local CRT equipment no longer meet an enterprise display standard; which operates without operator intervention.

The invention is specifically concerned with the luminance performance of a CRT display device within its ambient environment; the invention does not address other critical characteristics of display device fidelity such as spatial resolution or modulation transfer function. The invention presumes no specific knowledge of the task of the viewer or what the image represents hence no form of image dependent processing or adjustment is effected. Rather, the invention enables predictable and expedited image perception over time and location for a class of equipment which would otherwise require ongoing intervention by operator or maintenance personnel to ascertain luminance quality control. Only with such luminance quality control can task or image dependent processing be expected to consistently achieve an advantageous or even reproducible visual change across multiple displays.

Briefly, there is provided a system for measuring the absolute luminance of a CRT display device and the absolute luminance as would be measured from a viewer's perspective due to the additional reflected contribution of the ambient illuminance, such measurements being utilized in a closed loop to effect the necessary adjustments which determine in combination the absolute levels of maximum and minimum luminance of the CRT display device in response to monitored variations in equipment performance and in ambient lighting, such measurements also being available through standard video cabling to the host computer, the system comprising in combination an image display device including a CRT for computerized display of radiological images, the perception of which varies with luminance presentation and ambient illuminance, the system further comprising a photosensor unobtrusively carried in relation to the CRT such that light generated internally by the CRT phosphor will be received by the photocell and in the absence of such light that resulting from the ambient lighting at the face of the CRT will predominate at the photocell, circuitry and processing algorithms to interpret the output of the photocell and to enable complete blanking of the CRT phosphor.

The inventive system effectively measures and facilitates compensation for variations in luminance performance and ambient light which otherwise tend to interfere with the fidelity or facility of image interpretation of computerized static images, especially radiological images, displayed by the CRT.

Other objects, advantages and features will be in part apparent and in part pointed out herein below.

BRIEF DESCRIPTION OF THE DRAWINGS

Corresponding reference characters indicate corresponding parts throughout the drawings. Features identified 20–29 are specific to the inventive system.

DESCRIPTION OF PRACTICAL EMBODIMENTS

As multiple displays are deployed across an enterprise network, inevitable variations of luminance performance from initial calibration and of ambient illumination decrease the probability that the same digital image will always appear to be identical at all sites. To achieve such consistency, each display must be measured and readjusted with sufficient frequency to anticipate all such variations. Accordingly, it is simply not possible, as a practical matter, or certainly would be inconvenient in a production environment to manually calibrate or ascertain on demand the luminous response of any particular display much less all such like displays on the enterprise network.

Instead, the inventive system enables automatic and unobtrusive measurement of absolute CRT display luminance and the actual effective luminance as would be measured from the viewer's perspective due to additional reflected ambient illuminance in order to enable closed loop adjustment of the display device with features evident from the following description.

Figure 2:
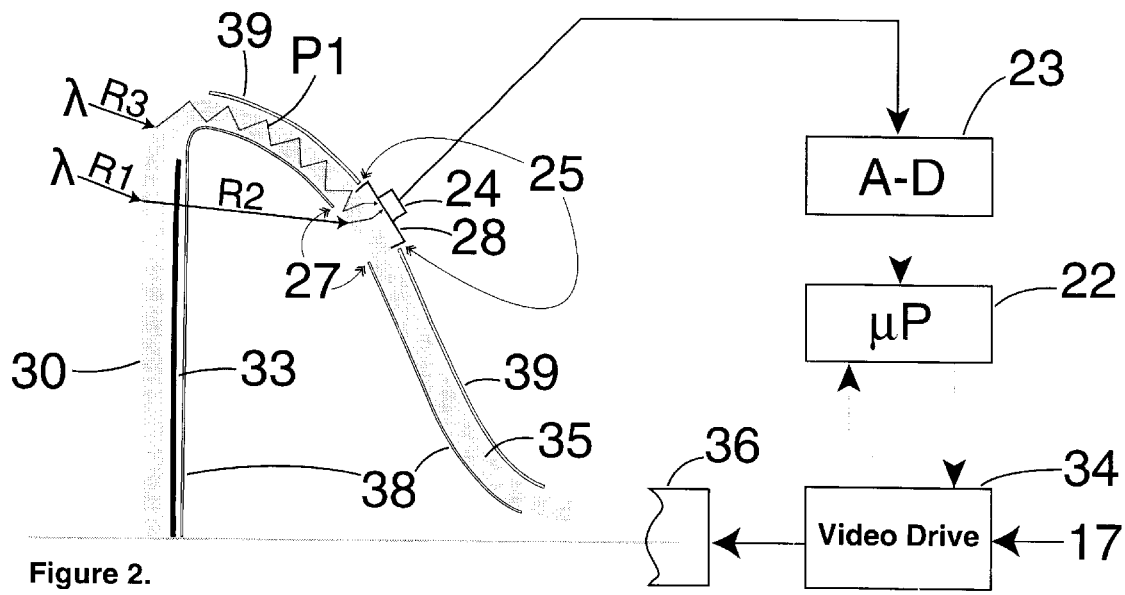
FIG. 2 is partial cutaway section of a CRT (Cathode Ray Tube), showing only certain portions to one side of a horizontal centerline through the electron gun assembly. The figure is otherwise greatly simplified, conceptually illustrative of only salient aspects of the system which are required of or proximate to the physical CRT, and includes circuit features in block diagram form.

Referring now to FIG. 2, a photosensor, namely a photocell 24, is specially affixed to the exterior surface of the conventional glass envelope, "jug", 35 of the CRT in such a manner and location that: 1) the sensor is not visible to a viewer of the face of the CRT; 2) the sensor and CRT are intimately sealed so that their optical coupling cannot be affected over time by dust, oil, or other airborne contaminants; 3) the sensor "sees" a combination of light from two principal sources, excited CRT phosphor and ambient illumination on the face of the CRT. Between photocell 24 and the outer surface of envelope 35 is a spectral filter 28 in the form of a thin translucent layer with spectral properties such that the product of the wavelength response of the photocell and that of the translucent layer match the spectral sensitivity response of the human eye.

Spectral matching layer 28 may be integrally formed as a unit with photocell 24 for being affixed to the CRT as a single layer, as by light-transmissive adhesive.

The photocell is a linear device such that its output signal may be the sum of two components, one which is proportional to the absolute luminance of the excited phosphor as measured at the face of the CRT and the other which is proportional to the ambient illuminance as measured at the CRT face.

In the preferred embodiment, photocell 24, is a silicon photodiode which produces a current directly proportional to the number of photons (light flux) impinging on its active surface per unit time. The photodiode sensitivity (active surface area) must be sufficient to produce a useable signal over the complete range of light to be sensed and measured which as a practical minimum is 5 decades with an effective minimum signal level of roughly I picoampere. The actual minimum signal depends on the optical transmission parameters of the faceplate 30 and jug 35 of the CRT tube. These parameters normally have a wide range so that each photodiode and CRT combination must be calibrated as a unique pair to determine the particular set of independent linear constants for the measure of ambient and phosphor-sourced light. The photocell is mounted in any practical location so as to be responsive to two components of light, one which is proportional to the absolute luminance of the excited phosphor as measured at the face of the CRT and the other which is proportional to the ambient illuminance as measured at the CRT face. The resulting signal response can be represented:

$$L = k1(P) + k2(A) \qquad \text{equation 1.}$$

where L is the instantaneous magnitude of the sensor response, P is the instantaneous luminance measured at the face of the CRT due to uniform excitation of a definedarea of the display phosphor, A is the ambient illumination at the face of the CRT, and K1 and k2 are the appropriate linear calibration constants for the phosphor and ambient components.

Note that the association of CRT and photocell differs from other "rearview window" teachings of color beam positioning such as Corpew in U.S. Pat. No. 3,376,465 which positional means must respond only to light internally generated by the CRT and necessarily must restrict the "feedback detector" to positions where no variation of ambient light can be sensed by the photocell.

In one embodiment, the photosensor is preferably positioned upon a surface location 25 of envelope 35 rearwardly of not only face 30 but also rearwardly of a phosphor layer 33 applied internally of face 30, at position 25 on what may be regarded as a shoulder of the envelope where it 35 takes on a quasiconical or frustoconical configuration and proceeds sloping toward the neck 36 of the tube. In this position of photocell 24 upon the envelope surface, light generated at the phosphor layer 33, as backed by a reflective but partially light-transmissive mask 38, may be detected, without interference by intervening structure internally of envelope 35, such as the usual aluminized anode layer 38 which for the present purposes includes a window 27 such that there is accordingly a direct optical path between the phosphors 33 and the light-receiving surface of photocell 24. In addition, the CRT envelope (jug) conventionally is provided with an external conductive light shield 39 which may be a coating normally occupying the region of the photocell, but for the present purposes including a window 25 opening therethrough in the position of the photocell and associated spectral layer for transmission of light from the envelope to the photocell.

Interconnected and proximally associated with photocell 24 is circuitry to amplify and transform the sensor output to a binary signal which can be readily interpreted by a microprocessor control. In the preferred embodiment a low impedance current to frequency converter transforms the sensitive analog output of the photosensor to a buffered binary signal with a dynamic range of at least 5 decades.

The microprocessor control interprets the resulting binary signal. The phosphor contribution P to the signal L of equation 1 has a period corresponding to the vertical refresh or frame time of the CRT display device. A timing signal 12 (FIG. 3) at this rate is provided from the display device to the microprocessor control to facilitate computation of the average frequency over precisely an integral number of frame periods. Additionally the control can cause absolute blanking of the CRT which, in the preferred embodiment, can be effected by sufficient reduction of the positive voltage at the G2 element of the CRT electron gun independent of the video signaling level between the cathode and G1 elements.

When the CRT phosphors are not excited, as when the potential at the G2 element of the CRT has been reduced by the microprocessor control to zero volts, and after sufficient time such that all phosphor luminance has decayed, ambient light falls on the face of the CRT such that a fixed proportion of the light can at that moment be detected at photocell 24 and the ambient light thereby measured exclusively. Such a sufficiently dark phosphor period for measurement of the ambient cannot be established by the external video source because the 'blackest'video input signal 17 may normally still produce phosphor excitation (the minimum luminance value of the characteristic curve.

With no phosphor contribution, all light at photocell 24 is a diffluse result of ambient illumination at the CRT face which has followed either of two general paths. As shown in FIG. 2, ray R1 strikes the phosphor coating which makes up layer 33. Some fraction may penetrate the phosphor and backing layer 38 to arrive as R2 at the glass envelope 35 and pass through the jug and spectral filter 28 to be incident upon photocell 24. The ambient light is also conducted directly by the glass of envelope 35. Ray R3 is illustrative. The CRT envelope effectively "light-pipes" such ambient illumination to the photocell. An essentially zigzag light path designated P1 symbolizes the "light-pipe" illumination path for a portion of ambient light to the photocell.

At other times when the phosphor layer is excited, some consistent portion of the generated light projects "backwards" through holes in the backing layer 38 and proceeds as previously discussed and illustrated by ray R2 to photocell 24. In the absence of ambient light and when the fill display is uniformly excited (simple flat field test pattern), the photosignal (integrated for one frame period) is proportional to the face-measured luminance of the CRT display device over its entire video range of "black" to "white". Accordingly, photocell 24 effectively "sees" a combination of proportionate light generated from the phosphor layer and ambient illumination at the CRT face; and it will be appreciated that photocell 24 provides a relative illuminance signal for measurement when the phosphor is not stimulated; but when the phosphor is thereafter excited by the electron beam, the resulting relative luminance (CRT phosphor) is discernible as the increase above the relative illuminance (ambient) measurement. By so measuring the minimum luminance (the relative luminance value taken with analog video signal at minimum over the entire display, "blacks") and maximum luminance (the relative luminance value with analog video signal at maximum over the entire display, "white"), the endpoints of the characteristic curve for the device (FIG. 1) are determined.

In the preferred embodiment, the circuit means produces a frequency signal FL which is analogous to equation 1 such that $FL=FP+FA$; where FL is the frequency presented to the microprocessor control for measurement and interpretation, FP is the frequency due to the phosphor generated light at the photocell 24 and FA is the frequency due to the ambient-sourced light at the photocell 24. When FP=0 (full blank; e.g. G2 set to 0) then FL=FA and is recorded by the microprocessor. Then FP (G2 restored) can be determined by subtracting FA (recorded) from the newly measured FL. In determining FL, the microprocessor computes the value equivalently to a time average which approximates the integration time of the human visual system (and any appropriate photometer). FP is then proportional to the absolute luminance measured at the face of the CRT. The conversion constant, CP, is the slope between pairs of luminance and frequency measurements made with no ambient illumination (phosphor luminance only), using the identical uniform test pattern, and is determined for each set of CRT, photocell, and circuitry (photosensor responsive means). The constant is stored with the set for access by the microprocessor control.

Analogously, a conversion constant, CA, is determined and stored to compute absolute ambient illuminance at the CRT face from FA (calibration data taken with FP=0). Similarly, a third calibration constant is determined with FP=0 to compute the component of ambient illuminance which reflects off the CRT face (glass and phosphor) and is indistinguishable by eye or photometer measurement from excited phosphor luminance. Calibration measurement of this constant is made with a photometer at a distance from the CRT face which does not block ambient illumination (shadow the CRT) yet does not target a wider field of view than would be occupied exclusively by the test pattern. This calibration constant, CE, enables determination of the effective characteristic curve (solid graph, FIG. 1) of the CRT in the presence of the particular level of ambient illuminance through calculations of the microprocessor control.

Figure 1:
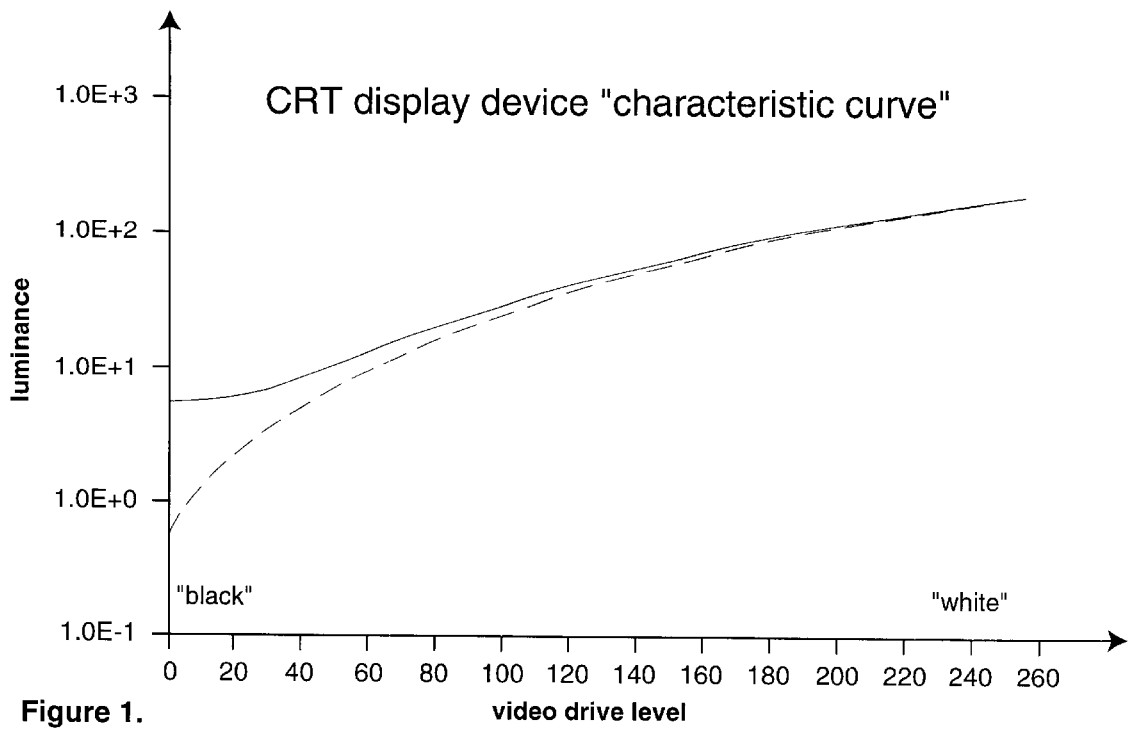
FIG. 1 is an illustrative "characteristic curve" for a monochrome CRT display device. Measured luminance is plotted for the standard range of video input signal (black to white). The lower (dashed) curve represents a measure of luminance from the phosphor exclusively (no ambient lighting). The upper (solid) curve represents a measure of the luminance from the CRT face which includes both the phosphor contribution and the reflected component from typical ambient room lighting as observed from the perspective of a viewer of the CRT face.
Figure 3:
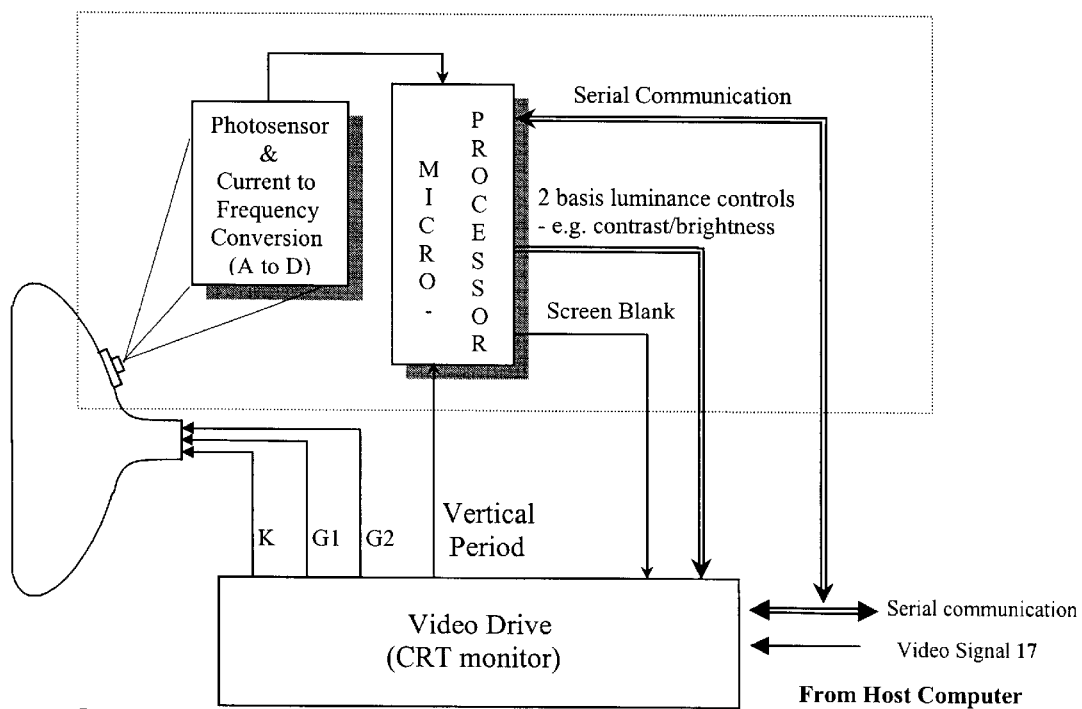
FIG. 3 is a block diagram illustrative of the signals which may be sensed and generated by the system as embodied within a classical CRT display device.

The actual luminance adjustment of the CRT display is in turn established by action of the microprocessor control on the effective gain and offset (or contrast and brightness, or in fact any two basis controls which, together, can determine 2 independent operating points in the plane of the characteristic curve, FIG. 1) of the video driver for the CRT display device. As a practical matter, the choice of basis controls will depend on the particular design of the CRT monitor (video amplifier) to which the inventive system may be 'added' (FIG. 3). By adjusting the video amplifier to achieve a particular absolute luminance when the input drive level is minimum and another specific luminance when the input drive is maximum, the end points of the characteristic curve may be established definitively.

Commonly, the shape of the characteristic curve may be effectively modified by the imposition of a nonlinear lookup table for the digital pixel values of the image before presentation to the display device. However, the maximum achievable contrast cannot be enhanced, merely redistributed.

Note that absolute luminance measurement and feedback to 2 basis controls of the display device (determine 2 operating points in the plane of the characteristic curve) constitutes "feedback control in 2 demensions" but is fundamentally different from image processing (modification of pixel data with a dependency on their 2 dimensional position within the image) as taught in other art such as by Haendle et al. in U.S. Pat. No. 5,444,755.

Also note that feedback control in 2 demensions differs from previous art which would effect 'ambient light compensation' in which there is one basis dimensional control for a single sensor and thus cannot simultaneously and independently establish both end points (max and min luminance) of the characteristic curve. Rather the previous art with a control in a single dimension may "shift", "rotate", "stretch" or otherwise transpose the characteristic curve to intersect at most any single arbitrary point (e.g. min luminance or max luminance but not both).

The luminance settings are established through one or more "closed loops" which may include: 1) feedback to match measured maximum and minimum luminance to factory values as an initialization procedure 2) proportionate increase of maximum luminance and/or decrease of minimum luminance for a measured increase of ambient illumination before a new image is displayed 3) report change in measured illumination and luminance of a displayed image to a remote processor for task dependent interpretation and determination of optimal luminance compensation which is then commanded back to the display device. Such reports and commands may be communicated through any I²C (Video Electronics Standards Association, DDC), RS232, local peripheral bus or other serial channel of the display device.

It is found that the system thus effectively provides absolute luminance and illuminance measurements from a single sensor to effect visual image fidelity over changes in device performance and ambient lighting without user intervention. It may be appreciated that there is provided an advantageous system for providing absolute illuminance measurement of a CRT display device automatically and establishing closed loop feedback to modify the luminance performance of a display device having a CRT with ambient illumination at the face of the CRT, the CRT being used to provide display of computerized static images, variations in luminance performance and ambient light tending to interfere with the fidelity or facility of displayed image interpretation of the computerized static images, the system comprising photosensor means carried in relation to the CRT such that a proportion of light resulting from the ambient lighting on the CIT face will be received by the photosensor means, namely a photocell, in addition to a portion of the light generated by the phosphor, and circuit means including photocell-responsive circuitry with processing algorithms interconnected to the photocell for controlling a video driver of the CRT as a function of light received by the photocell to compensate for said variations.

Accordingly, it will be seen that the present invention, as used with a CRT display device having a glass envelope jug and a display face carrying internally of the display face phosphors in a phosphor layer over which internally of the phosphor layer is a reflective, partially light-transmissive mask, provides an advantageous system for automatically measuring the absolute luminance of the CRT display device and the ambient illuminance produced by illumination at the face of the CRT, variations in luminance performance of the CRT and ambient illumination tending to interfere with the fidelity or facility of displayed image interpretation of images displayed by the CRT, the system comprising in combination a photosensor carried invisibly to a viewer of the CRT face while presented in intimate relation to the CRT such that a reproducibly measurable illuminance proportion of light resulting from the ambient lighting on the CRT face will be received indirectly by the photosensor in addition to another reproducibly measurable luminance proportion of the light generated by said phosphors of the CRT, the photosensor being positioned on the jug of the CRT at a location rearward of the display face of the CRT for receiving light backwardly emitted through the mask from said phosphors of the CRT, and for receiving light indirectly from ambient light impinging on the CRT display face, and so positioned that the output of the photosensor is the sum of two components, one of which is proportional to the absolute luminance of excited phosphors from the face of the CRT as said luminance is measured by the photosensor through the mask and the other of which is proportional to the ambient illuminance as received at the CRT face, and means responsive to the photosensor for determining said absolute luminance and illuminance.

In view of the foregoing description of the present invention and methods, it will be seen that the several objects of the invention are achieved and other advantages are attained.

As various modifications could be made in the constructions and methods herein described and illustrated without departing from the scope of the invention, it is intended that all matter contained in the foregoing description or shown in the accompanying drawings shall be interpreted as illustrative rather than limiting. For example, while for display of radiographic and other images of critical contrast detail by computer-controlled technique, the CRT may be of monochromic type, and for which gray-scale data of desired resolution may be provided, it is also possible that the present invention may be used in connection with color displays, as in the graphics arts or home theater applications and for which color temperature, balancing and relative luminance, for example, may presuppose a convenient absolute measurement display-control need similar to that which motivates the present invention, which may thus be used to advantage in connection with such color displays.

Thus, the breadth and scope of the present invention should not be limited by any of the above-described exemplary embodiments, but should be defined only in accordance with the following claims appended hereto and their equivalents.

What is claimed is:

1. For use with a CRT display device having a glass envelope jug and a display face carrying internally of the display face phosphors in a phosphor layer backed internally of the glass envelope jug by a reflective, partially light-transmissive mask, a system for automatically measuring the absolute luminance of the CRT display device and the ambient illuminance produced by illumination at the face of the CRT, variations in luminance performance of the CRT and ambient illumination tending to interfere with the fidelity or facility of displayed image interpretation of images displayed by the CRT, the system comprising in combination a photosensor carried invisibly to a viewer of the CRT face while presented in intimate relation to the CRT such that a reproducibly measurable illuminance proportion of light resulting from the ambient lighting on the CRT face will be received indirectly by the photosensor in addition to another reproducibly measurable luminance proportion of the light generated by said phosphors of the CRT, the photosensor being positioned on the jug of the CRT at a location rearward of the display face of the CRT for receiving light emitted backward through the mask from said phosphors of the CRT, and for receiving light indirectly from ambient light impinging on the CRT display face, and so positioned that the output of the photosensor is the sum of two components, one of which is proportional to the absolute luminance of excited phosphors from the face of the CRT as said luminance is measured by the photosensor through the mask and the other of which is proportional to the ambient illuminance as received at the CRT face, and means responsive to the photosensor for determining said absolute luminance and illuminance.

2. A system according to claim 1 wherein the photosensor means is a linearly responsive photocell affixed to jug of the CRT in such a continuous and intimate manner that no dust, oil, or other airborne contaminant can, cumulatively over time, effect a change to the optical coupling of the photocell and CRT.

3. A system according to claim 2 wherein the intimate photocell and CRT attachment includes an intervening light-trasmissive layer with spectral properties such that the wavelength response of the photocell matches the spectral sensitivity response of the human eye.

4. A system according to claim 1 wherein the photosensor is positioned proximate to the jug of the CRT at a location where the glass is not subject to electron browning.

5. For use with a CRT display device having a glass envelope jug a and a display face carrying internally of the display face phosphors, a system for a automatically measuring the absolute luminance of a CRT display device having a CRT and the ambient illumination at the face of the CRT, variations in luminance performance of the CRT and ambient illumination tending to interfere with the fidelity or facility of displayed image interpretation of images displayed by the CRT, the system comprising in combination a photosensor carried invisibly to a viewer of the CRT face while presented in intimate relation to the CRT such that a reproducibly measurable illuminance proportion of light resulting from the ambient lighting on the CRT face will be received indirectly by the photosensor in addition to another reproducibly measurable luminance proportion of the light generated by phosphors of the CRT and means responsive to the photosensor for determining said absolute luminance and illuminance, wherein the photosensor-responsive means comprises a current to frequency converter interconnected and closely associated with the photosensor means for integrating and converting the analog output of the photosensor means to a buffered binary signal with a dynamic range of at least 5 decades, and a microprocessor control to interpret the resulting binary signal and to effect with certainty the absolute blanking of the CRT as by sufficient reduction of the positive voltage at the G2 element of the CRT electron gun.

6. A system according to claim 5 wherein the microprocessor control is hardware triggered by the actual frame refresh signal of the CRT to ensure sensor signal integration over the minimum time to precisely capture the periodic phosphor generated luminance.

7. A system according to claim 5 wherein the microprocessor control includes a procedure for determining individual ambient FA and phosphor FP generated components of FS, the converted photosensor signal FS, with FS=FA+FP, such procedure fundamentally consisting of the following steps:

1) Force FP=0 by totally blanking the CRT display (G2 @CRT=0 volts or otherwise biased to cutoff)
2) Measure FS=FA and record the value of FA
3) Re-enable the display luminance (restore CRT bias)
4) Measure FS and subtract FA leaving FP.

8. A system according to claim 7 wherein the determining means provides a multiplication of FP, the procedurally determined component of the converted photosensor signal FS by CP, a calibration constant with dimensions of luminance/(Hz which is precomputed to match the particular CRT, photosensor, and current to frequency converter.

9. A system according to claim 8 wherein the determining means provides multiplication of FA, the procedurally determined ambient component of the converted photosensor signal FS by CA, a calibration constant with dimensions of illuminance/Hz which is precomputed to match the particular CRT, photosensor, and current to frequency converter.

10. A system according to claim 1 wherein the measurement of absolute luminance is the actual effective luminance which would be either observed measured by photometer from the normal perspective of a viewer of the CRT face due to the indistinguishable combination of both reflected ambient light and phosphor generated light.

11. A system according to claim 10 wherein the actual effective luminance of the CRT is determined by computing the sum of a phosphor generate luminance component with a reflected illuminance component determined by the multiplication of FA, a procedurally determined ambient component of the converted photosensor signal FS, by CE, a calibration constant with dimensions of luminance/Hz which is precomputed to match the particular CTR, photosensor, and current to frequency converter.

12. A system according to claim 1 wherein the wavelength response of the photocell is caused to match the spectral sensitivity response of the human eye.

13. A system according to claim 5 wherein the wavelength response of the photocell is caused to match the spectral sensitivity response of the human eye.

* * * * *

UNITED STATES PATENT AND TRADEMARK OFFICE
CERTIFICATE OF CORRECTION

PATENT NO. : 6,327,708 B1
DATED : December 4, 2001
INVENTOR(S) : Thomas L. Monsees It is certified that error appears in the above-identified patent and that said Letters Patent is hereby corrected as shown below:

Column 7,
Line 65, replace "curve." with -- curve) --.

Column 8,
Line 16, replace "fill" with -- full --.

Column 9,
Line 35, replace "demensions" with -- dimensions --.
Line 44, replace "or" with -- or --.
Line 65, replace "illuminance" with -- luminance --.

Column 10,
Line 9, replace "CIT" with -- CRT --.

Column 11,
Line 46, replace "trasmissive" with -- transmissive --.
Line 53, replace "jug a" with -- jug --.
Line 54, replace "for a" with -- for --.

Column 12,
Line 35, replace "luminance (Hz" with -- luminance Hz --.
Line 51, replace "generate" with -- generated --.

Signed and Sealed this

Twenty-first Day of May, 2002

*Attest:*

*Attesting Officer*

JAMES E. ROGAN
*Director of the United States Patent and Trademark Office*